US008650851B2

(12) United States Patent
Ouellet et al.

(10) Patent No.: US 8,650,851 B2
(45) Date of Patent: Feb. 18, 2014

(54) SYSTEMS AND METHODS FOR CONTROLLING FUEL FLOW WITHIN A MACHINE

(75) Inventors: Noemie Dion Ouellet, Greenville, SC (US); Abdul Rafey Khan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 913 days.

(21) Appl. No.: 12/652,376

(22) Filed: Jan. 5, 2010

(65) Prior Publication Data

US 2011/0162343 A1 Jul. 7, 2011

(51) Int. Cl.
*F02C 9/48* (2006.01)
*F02C 9/26* (2006.01)
*F23R 3/36* (2006.01)

(52) U.S. Cl.
USPC ........... 60/39.281; 60/39.463; 60/776; 60/734

(58) Field of Classification Search
USPC .................. 60/39.281, 39.463, 773, 776, 734
See application file for complete search history.

(56) References Cited

U.S. PATENT DOCUMENTS

| | | | |
|---|---|---|---|
| 3,805,519 A | 4/1974 | Plotnick et al. | |
| 4,292,801 A | 10/1981 | Wilkes et al. | |
| 4,420,929 A | 12/1983 | Jorgensen et al. | |
| 4,761,948 A * | 8/1988 | Sood et al. | 60/39.281 |
| 5,259,186 A | 11/1993 | Snow | |
| 5,305,597 A | 4/1994 | Snow | |
| 5,491,970 A | 2/1996 | Davis, Jr. et al. | |
| 5,551,228 A | 9/1996 | Mick et al. | |
| 6,226,976 B1 | 5/2001 | Scott et al. | |
| 6,405,522 B1 * | 6/2002 | Pont et al. | 60/39.281 |
| 6,438,937 B1 * | 8/2002 | Pont et al. | 60/776 |
| 6,532,726 B2 * | 3/2003 | Norster et al. | 60/39.281 |
| 6,609,378 B2 | 8/2003 | Scott | |
| 6,722,135 B2 | 4/2004 | Davis, Jr. et al. | |
| 6,761,032 B2 | 7/2004 | Moser | |
| 7,246,002 B2 | 7/2007 | Healy et al. | |
| 7,396,228 B2 | 7/2008 | Tanabe et al. | |
| 7,891,192 B2 * | 2/2011 | Myers et al. | 60/741 |
| 2006/0248894 A1 * | 11/2006 | Hiramoto et al. | 60/772 |
| 2007/0119178 A1 * | 5/2007 | Berenbrink et al. | 60/773 |
| 2008/0083229 A1 * | 4/2008 | Haynes et al. | 60/776 |
| 2008/0183362 A1 | 7/2008 | Dooley et al. | |
| 2009/0234555 A1 * | 9/2009 | Williams et al. | 701/100 |
| 2009/0272097 A1 * | 11/2009 | Lawson et al. | 60/39.463 |
| 2010/0043387 A1 * | 2/2010 | Myers et al. | 60/39.281 |
| 2010/0162724 A1 * | 7/2010 | Myers et al. | 60/794 |

* cited by examiner

*Primary Examiner* — William H Rodriguez
*Assistant Examiner* — Carlos A Rivera
(74) *Attorney, Agent, or Firm* — Sutherland Asbill & Brennan LLP

(57) ABSTRACT

Systems and methods for controlling fuel flow within a machine are provided. A plurality of fuel types provided to the machine and a plurality of fuel circuits associated with the machine may be identified, each of the plurality of fuel circuits adapted to be provided with one or more of the plurality of fuel types. A fuel flow parameter for calculating fuel flow may be identified, and a respective fuel flow for each of the one or more fuel types provided to each of the plurality of fuel circuits may be calculated based at least in part on the identified fuel flow parameter. Based at least in part on the calculation of the respective fuel flows, operation of one or more fuel flow control devices providing fuel to the plurality of fuel circuits may be controlled.

18 Claims, 2 Drawing Sheets

SYSTEMS AND METHODS FOR CONTROLLING FUEL FLOW WITHIN A MACHINE

FIELD OF THE INVENTION

Embodiments of the invention relate generally to machines and more specifically to systems and methods for controlling fuel flow within a machine.

BACKGROUND OF THE INVENTION

Certain machines, such as gas turbines, power generating devices, etc., utilize fuel to power their operations. For example, a conventional gas turbine typically utilizes natural gas as a fuel that is combusted in order to rotate a turbine section. Natural gas supplied to the gas turbine is often divided into several flows that are supplied to different fuel circuits within the gas turbine, such as one or more fuel circuits within a combustor section of the gas turbine. Given the use of a single fuel type in these conventional gas turbines, the splitting of natural gas is typically accomplished via mass flow based fuel splits.

However, in certain machines and other applications, a plurality of different fuel types may be utilized. For example, recent gas turbines applications may utilize both natural gas and synthesis gas. Due to the presence of different fuel compositions across the various fuel circuits, traditional mass flow based fuel splitting is inadequate because the mass flow and energy contents are not equivalent or proportional for the different fuels. Using mass flow based fuel splits with different fuel compositions may lead to combustion instabilities, hardware damage, and/or compromise the performance and operability of the gas turbine.

Accordingly, a need exists for improved systems and methods for controlling fuel flow within a machine.

BRIEF DESCRIPTION OF THE INVENTION

Some or all of the above needs and/or problems may be addressed by certain embodiments of the invention. Embodiments of the invention may include systems and methods for controlling fuel flow within a machine. According to one embodiment of the invention, there is disclosed a method for controlling fuel flow within a machine. A plurality of fuel types provided to the machine may be identified. Additionally, a plurality of fuel circuits associated with the machine may be identified, each of the plurality of fuel circuits adapted to be provided with one or more of the plurality of fuel types. A fuel flow parameter for calculating fuel flow may be identified, and a respective fuel flow for each of the one or more fuel types provided to each of the plurality of fuel circuits may be calculated based at least in part on the identified fuel flow parameter. Based at least in part on the calculation of the respective fuel flows, operation of one or more fuel flow control devices providing fuel to the plurality of fuel circuits may be controlled. In certain embodiments, the method may be a computer-implemented method performed by one or more computers associated with a machine controller.

According to another embodiment of the invention, there is disclosed a system for controlling fuel flow within a machine. The system may include at least one memory and at least one processor. The at least one memory may be operable to store computer-executable instructions. The at least one processor may be configured to access the at least one memory and execute the computer-executable instructions to: identify a plurality of fuel types provided to the machine; identify a plurality of fuel circuits associated with the machine, each of the plurality of fuel circuits adapted to be provided with one or more of the plurality of fuel types; identify a fuel flow parameter for calculating fuel flow; calculate a respective fuel flow for each of the one or more fuel types provided to each of plurality of fuel circuits based at least in part on the identified fuel flow parameter; and control, based at least in part on the calculation of the respective fuel flows, operation of one or more fuel flow control devices providing fuel to the plurality of fuel circuits.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
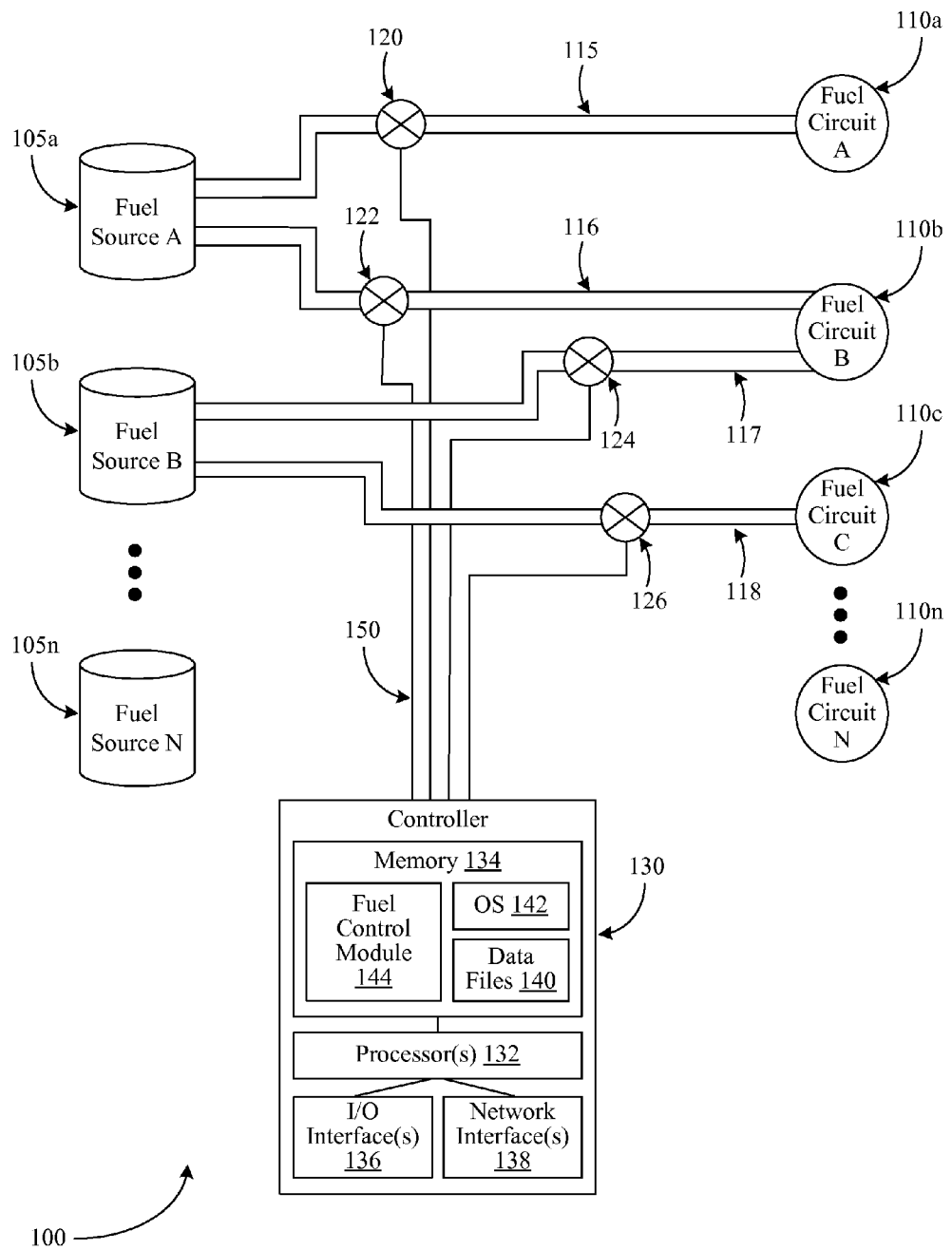

Having thus described the invention in general terms, reference will now be made to the accompanying drawings, which are not necessarily drawn to scale, and wherein:

FIG. 1 is a schematic diagram of one example system for controlling fuel flow within a machine, according to an illustrative embodiment of the invention.

Figure 2:
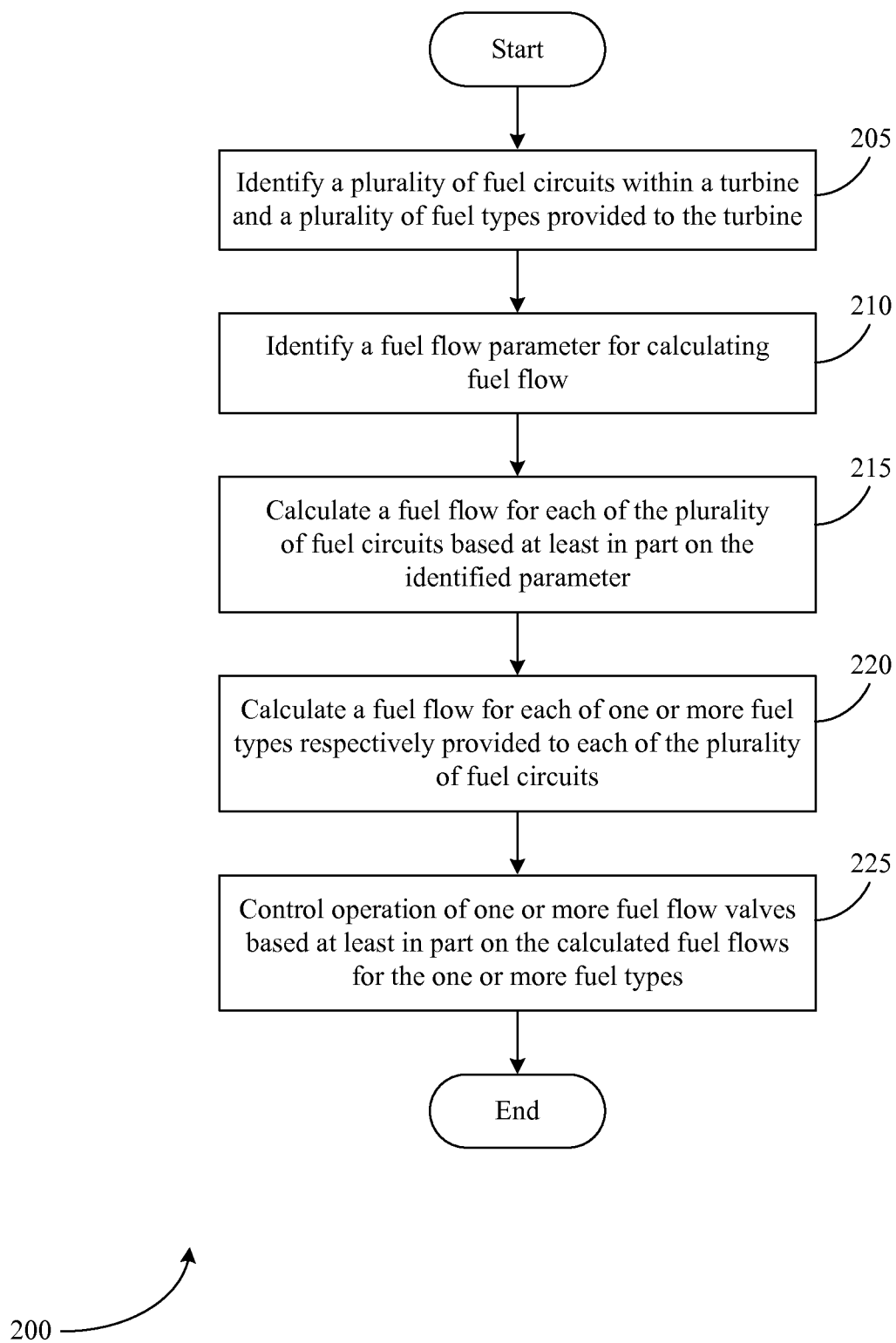

FIG. 2 is a flow chart of one example method for controlling fuel flow within a machine, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For purposes of this disclosure, the term "machine" may refer to any suitable device, system, method, and/or combination of devices and/or systems and/or methods that utilize fuel to operate. In certain embodiments, a machine may utilize multiple sources and/or types of fuel. Examples of machines include, but are not limited to, gas turbines, power generating devices, rotating machines, reciprocating engines, steam boilers, etc.

For purposes of this disclosure, the term "fuel circuit" may refer to a component, zone, or subsystem of a machine that is provided with a fuel. In certain embodiments, a fuel circuit may be configured to be provided with one or more types of fuel. For example, in a gas turbine, a fuel circuit, such as a portion of a gas turbine combustor, may be configured to receive natural gas, synthesis gas, or a combination of natural gas and synthesis gas.

Disclosed are systems and methods for controlling fuel flow within a machine. A plurality of fuel types that are provided to the machine may be identified. Additionally, a plurality of fuel circuits within the machine may be identified. Each of the fuel circuits may be configured to or adapted to be provided with one or more of the plurality of fuel types. Due to the different fuel types, controlling fuel flow based upon traditional fuel splits, such as mass flow based fuel splits, may be inadequate. Accordingly, a respective fuel flow may be calculated for each of the one or more fuel types that are supplied to each of the plurality of fuel circuits based upon an identified or selected fuel flow parameter, for example, an energy based fuel flow parameter. The operation of one of more fuel flow control devices (e.g., valves) that supply fuel to the plurality of fuel circuits may then be controlled based at least in part on the calculation of the respective fuel flows.

Various embodiments of the invention may include one or more special purpose computers, systems, and/or particular machines that facilitate the controlling of fuel flow within a machine. A special purpose computer or particular machine may include a wide variety of different software modules as desired in various embodiments. As explained in greater detail below, in certain embodiments, these various software components may be utilized to monitor machines and/or to control fuel flow to and/or within a machine.

Certain embodiments of the invention described herein may have the technical effect of controlling fuel flow within a machine. Certain embodiments of the invention may further have the technical effect of controlling the flow of a plurality of different fuel types within a machine. For example, the flows of natural gas and synthesis gas may be controlled within a gas turbine or other machine according to one embodiment of the invention.

FIG. 1 is a block diagram of one example system 100 for controlling fuel flow within a machine, according to an illustrative embodiment of the invention. The system 100 illustrated in FIG. 1 may include one or more fuel sources 105a-n, one or more fuel circuits 110a-n, and a controller 130.

According to an aspect of the invention, any number of fuel sources 105a-n may be provided. A plurality of different types of fuel may be provided from the fuel sources 105a-n to a machine. For example, fuel may be provided from the fuel sources 105a-n to a gas turbine. Each fuel source may be any suitable fuel source or supply of fuel, for example, a fuel tank, a fuel line, etc. Additionally, each fuel source 105a-n may be operable to provide a separate type of fuel to the machine; however, a single type of fuel may be provided by multiple fuel sources as desired in various embodiments. Utilizing the example of a gas turbine, a first fuel source 105a may be a source of natural gas, and a second fuel source 105b may be a source of synthesis gas. Synthesis gas, or syngas, may be a gas mixture that contains varying amounts of different types of gases, for example, varying amount of carbon monoxide, hydrogen, and/or carbon dioxide. Although a gas turbine is utilized as an example of a machine, various embodiments of the invention may equally be applicable to other types of machines, for example, other power generating devices, rotating machines, reciprocating engines, steam boilers, etc.

With continued reference to FIG. 1, any number of fuel circuits 110a-n may be associated with the machine. For example, any number of fuel circuits 110a-n, such as combustor sections and/or combustion chambers, may be associated with a gas turbine. Each fuel circuit 110a-n may be configured to be provided with and receive one or more types of fuel. As shown in FIG. 1, a first fuel circuit 110a may be provided with fuel from the first fuel source 105a. A second fuel circuit 110b may be provided with fuel from the first fuel source 105a and/or the second fuel source 105b. A third fuel circuit 110c may be provided with fuel from the second fuel source 105b. Utilizing a simplified gas turbine example, a first fuel circuit 110a may be provided with natural gas, a second fuel circuit 110b may be provided with both natural gas and syngas, and a third fuel circuit 110c may be provided with syngas.

Any number of fuel lines or fuel supply lines may facilitate the provision of fuel from the fuel sources 105a-n to the fuel circuits 110a-n. Each fuel line may include any suitable devices, apparatus, systems, and/or methods that facilitate the provision of fuel to a fuel circuit. For example, the fuel lines may include pipes and/or other suitable flow chambers that are configured to provide fuel from a fuel source to a fuel circuit. Additionally, any number of control valves or other suitable flow control devices may be utilized to control the flow of fuel through the fuel lines. As shown in FIG. 1, a first fuel line 115 may provide fuel from the first fuel source 105a to the first fuel circuit 110a; a second fuel line 116 may provide fuel from the first fuel source 105a to the second fuel circuit 110b, a third fuel line 117 may provide fuel from the second fuel source 105b to the second fuel circuit 110b, and a fourth fuel line 118 may provide fuel from the second fuel source 105b to the third fuel circuit 110c. With continued reference to FIG. 1, a control device, such as a control valve, may be associated with each fuel line. For example, a first control valve 120 may be associated with the first fuel line 115, a second control valve 122 may be associated with the second fuel line 116, a third control valve 124 may be associated with the third fuel line 117, and a fourth control valve 126 may be associated with the fourth fuel line 118. The control valves 120, 122, 124, 126 may be selectively opened and/or closed in order to control an amount or supply of fuel that is provided via the associated fuel lines 115, 116, 117, 118. For example, a position of each control valve 120, 122, 124, 126 may be adjusted in order to control an amount of fuel that is provided to a fuel circuit by an associated fuel line.

As desired in various embodiments of the invention, any number of sensors and/or other suitable measurements devices may be associated with the fuel sources 105a-n, control valves 120, 122, 124, 126, fuel lines 115, 116, 117, 118, fuel circuits 110a-n, and/or other components of the system 100. These sensors may be utilized to take various measurements associated with the provision of fuel to the fuel circuits 110a-n and/or the combustion of fuel within the fuel circuits 110a-n. Examples of measurements that may be taken include, but are not limited to, temperature measurements, pressure measurements, fuel flow measurements, etc. Additionally, as desired, one or more connections, such as the connections 150 discussed below may facilitate communications between the sensors and the control unit 130.

The fuel supply configuration shown in FIG. 1 is provided by way of example only. It will be appreciated that any number of different fuel supply configurations may be provided as desired in various embodiments of the invention. These configurations may include any number of fuel sources, fuel circuits, fuel lines, and/or control valves arranged in a suitable configuration to provide fuel to a machine.

The system 100 may further include at least one controller 130 or suitable control system. The controller 130 may be operable to monitor and/or control the fuel flow within a machine and/or the fuel flow to various components of the machine. For example, the controller 130 may be operable to monitor and/or control the provision or supply of natural gas and/or syngas to various fuel circuits within a gas turbine. As desired, the controller 130 may control the operation of the one or more control valves 120, 122, 124, 126 in order to control the provision of fuel to various fuel circuits within the gas turbine or other machine. As shown in FIG. 1, a plurality of connections 150 may facilitate communications between the controller 130 and the various control valves 120, 122, 124, 126 included in the system. A wide variety of suitable connections may be utilized to facilitate communication, for example, direct network connections, local area network connections, wide area network connections, Internet connections, Bluetooth™ enabled connections (trademark owned by BLUETOOTH SIG, INC.), radio frequency network connections, cellular network connections, any suitable wired connections, any suitable wireless connections, and/or any suitable combinations of connections.

With continued reference to FIG. 1, the controller 130 may be a suitable processor driven device that is capable of monitoring and/or controlling the provision of fuel to one or more fuel circuits associated with the machine. Examples of suitable controllers include, but are not limited to, application specific circuits, microcontrollers, minicomputers, personal computers, servers, other computing devices and the like. In certain embodiments the controller 130 may be or may be incorporated into a supervisory command and data acquisition (SCADA) system associated with a turbine, power source, and/or power plant. The controller 130 may include any number of processors 132 that facilitate the execution of computer-readable instructions to control the operations of the controller 130. By executing computer-readable instructions associated with monitoring and/or controlling fuel flow, the controller 130 may form a special purpose computer that controls the supply of fuel to one or more fuel circuits.

In addition to one or more processor(s) 132 the controller 130 may include one or more memory devices 134, one or more input/output ("I/O") interfaces 136, and one or more network interfaces 138. The one or more memory devices 134 or memories may be any suitable memory devices for example, caches, read only memory devices, random access memory devices, magnetic storage devices, etc. The one or more memory devices 134 may store data, executable instructions, and/or various program modules utilized by the controller 130, for example, data files 140, an operating system 142, and/or a fuel control module 144 or fuel application. The data files 140 may include stored data associated with the operation of the machine, stored data associated with the fuel sources 105a-n, stored data associated with the fuel types (e.g., natural gas and syngas for a gas turbine application), stored data associated with the fuel circuits 110a-n, stored data associated with the operation of the control valves 120, 122, 124, 126, and/or data associated with various fuel flow calculations.

In certain embodiments of the invention, the controller 130 may include any number of software applications that are executed to facilitate the operations of the controller 130. The software applications may include computer-readable instructions that are executable by the one or more processors 132. The execution of the computer-readable instructions may form a special purpose computer that facilitates the monitoring and/or controlling of fuel flow within the machine. As an example of a software application, the controller 130 may include an operating system ("OS") 142 that controls the general operation of the controller 130 and that facilitates the execution of additional software applications. The controller 130 may also include a fuel control module 144 that is operable to monitor and/or control the fuel flow within the machine. For example, the fuel control module 144 may determine or calculate desired and/or expected fuel flows within the machine for the various fuel types, and the fuel control module 144 may adjust the positions of the control valves 120, 122, 124, 126 based at least in part upon the calculations.

In various embodiments of the invention, the fuel flow module 144 may monitor and/or control the fuel flow to one or more fuel circuits associated with the machine. The fuel flow module 144 may calculate or determine a respective fuel flow, such as a desired fuel flow or an expected fuel flow, for each of the fuel lines 115, 116, 117, 118 associated with the system 100. The fuel flow module 144 may then control operation of the control valves 120, 122, 124, 126 based upon the calculated or determined fuel flows. According to an aspect of the invention, the calculation of the respective fuel flows may be made utilizing one or more predetermined, identified, or selected fuel flow parameters. Examples of suitable fuel flow parameters include, but are not limited to, an energy flow parameter, a volumetric flow parameter, or a fuel constituent flow parameter. An energy flow parameter, such as a lower heating value parameter, a higher heating value parameter, a gross heating value parameter, an energy density parameter, a Wobbe Index parameter, a modified Wobbe Index parameter, or another energy flow parameter, may facilitate the determination of fuel flow based upon the energy provided over time by the fuel type associated with the fuel flow. A volumetric flow parameter may facilitate the determination of fuel flow based upon the volume of a given fuel type that is provided over time. A fuel constituent flow parameter may facilitate the determination of fuel flow based upon an amount of a given component or element of the fuel that is provided over time. For example, with a fuel flow of syngas, a fuel constituent flow parameter may be utilized to determine or calculate an amount of carbon dioxide or hydrogen that is provided over time for the syngas. The fuel flow parameter may be a parameter other than a mass flow based parameter. In this regard, fuel flow may be controlled within a machine in situations where fuel composition varies across the different fuel circuits. Additionally, suitable fuel control may be provided in applications where fuel blending does not occur in all fuel circuits. An example of the operations that may be performed by the fuel control module 144 is provided below with respect to FIG. 2. Additionally, although the fuel control module 144 is illustrated in FIG. 1 as a single component, the operations of the fuel control module 144 may be performed by any number of components, applications, and/or software modules as desired in various embodiments of the invention.

The one or more I/O interfaces 136 may facilitate communication between the controller 130 and one or more input/output devices, for example, a universal serial bus port, a serial port, a disk drive, a CD-ROM drive, and/or one or more user interface devices, such as, a display, keyboard, keypad, mouse, control panel, touch screen display, microphone, etc. that facilitate user interaction with the controller 130. The one or more I/O interfaces 136 may be utilized to receive or collect data and/or user instructions from a wide variety of input devices. Received data may be processed by the controller 130 as desired in various embodiments of the invention and/or stored in the one or more memory devices 134.

The one or more network interfaces 138 may facilitate connection of the controller 130 to one or more suitable networks and/or connections, for example, the connections 150 that facilitate communications with the control valves 120, 122, 124, 126 and/or any number of sensors associated with the control valves and/or other components of the system. In this regard, the controller 130 may receive data from one or more sensors and/or communicate data and/or commands to the control valves. The one or more network interfaces 138 may further facilitate connection of the controller 130 to one or more suitable networks, for example, a local area network, a wide area network, the Internet, a cellular network, a radio frequency network, a Bluetooth™ enabled network (trademark owned by BLUETOOTH SIG, INC.), a Wi-Fi™ enabled network (trademark owned by Wi-Fi Alliance Corporation), a satellite-based network, any wired network, any wireless network, etc. for communication with external devices and/or systems.

As desired, embodiments of the invention may include a system 100 with more or less than the components illustrated in FIG. 1. The system 100 of FIG. 1 is provided by way of example only.

FIG. 2 is a flowchart illustrating one example method 200 for controlling fuel flow within a machine, according to an illustrative embodiment of the invention. The method may be utilized in association with one or more fuel control systems, such as the system 100 illustrated in FIG. 1. In other words, the method 200 may be utilized by a suitable fuel control module, such as the fuel control module 144 illustrated in FIG. 1, to calculate or determine fuel flows within and/or associated with a machine and to control operation of one or more control valves associated with the machine.

The method 200 may begin at block 205. At block 205, a plurality of fuel circuits within a machine and/or associated with a machine may be identified, such as the fuel circuits 110a-n illustrated in FIG. 1. For example, a plurality of fuel circuits associated with a gas turbine may be identified, such as a plurality of fuel circuits associated with a combustor section of the gas turbine. Additionally, at block 205, a plurality of fuel types supplied to the machine may be identified. Utilizing a gas turbine example, natural gas, syngas, and/or other fuel types may be identified. Each of the plurality of fuel circuits may be configured to receive one or more of the plurality of identified fuel types. For fuel circuits that are configured to receive multiple fuel types, a desired blending ratio for the fuel types may be predetermined in certain embodiments of the invention.

At block 210, one or more fuel flow parameters for calculating or determining fuel flows within the machine may be identified or selected. For example, a fuel flow parameter that is utilized for calculating or determined desired and/or expected fuel flows within the machine may be identified. A wide variety of different fuel flow parameters may be utilized as desired in various embodiments of the invention, such as, an energy flow parameter (e.g., a lower heating value parameter, a higher heating value parameter, a gross heating value parameter, an energy density parameter, a Wobbe Index parameter, a modified Wobbe Index parameter, or another energy flow parameter), a volumetric flow parameter, or a fuel constituent flow parameter.

At block 215, which may be optional in certain embodiments of the invention, a fuel flow for each of the plurality of fuel circuits may be calculated or determined based at least in part on the identified fuel flow parameter. For example, a desired or expected fuel flow may be calculated for each of the plurality of fuel circuits based at least in part on the identified fuel flow parameter. As one example, if an energy based fuel flow parameter is identified at block 210, then a desired or expected energy flow or energy consumption for each of the plurality of fuel circuits may be calculated. In other words, a desired or expected amount of energy over time that should be provided to each of the plurality of fuel circuits may be calculated.

At block 220, a fuel flow for each of one or more fuel types that are supplied by one or more respective fuel sources, such as the fuel sources 105a-n illustrated in FIG. 1, to each of the plurality of fuel circuits may be calculated or determined. In this regard, a desired or expected fuel flow for each of the fuel types that are provided or supplied to a fuel circuit may be determined. In certain embodiments, the calculations may be based upon the calculations made at block 215 and/or on the fuel flow parameter identified at block 210. For example, if an energy based fuel flow parameter is identified at block 210, then a desired energy flow over time for each fuel circuit may be determined at block 215 and a respective desired energy flow for each of the fuel types provided to each fuel circuit may be calculated or determined at block 220. Using a gas turbine that is provided with both natural gas and syngas as an example, desired energy flows for natural gas and/or syngas that are provided to each fuel circuit may be determined. As another example, if a volumetric flow parameter is utilized, then desired or expected volumetric flows over time may be calculated for each fuel type that is provided to each of the plurality of fuel circuits. As yet another example, if a fuel constituent flow parameter is utilized, then desired or expected amounts of a given component (e.g., hydrogen, carbon monoxide (CO), etc.) of one or more fuel types that are provided over time to one or more fuel circuits may be calculated or determined.

At block 225, the operation of one or more fuel flow control valves or other fuel flow control devices, such as control valves 120, 122, 124, 126 illustrated in FIG. 1, may be controlled based at least in part on the calculated fuel flows for each of the one or more fuel types that are obtained in block 220. For example, the positions of one or more control valves within a machine may be controlled or adjusted based upon the calculated fuel flows. In this regard, the amount of each fuel type that is supplied to the fuel circuits within the machine may be controlled in a relatively accurate, efficient and/or suitable manner in order to provide a desired amount of fuel to each fuel circuit. The method 200 may end following block 225.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed. Furthermore, certain operations set forth in FIG. 2 may be performed in an iterative or periodic manner. For example, the operations set forth in blocks 215, 220, and 225 may be performed in an iterative manner or periodically performed in order to dynamically control fuel flow within a machine.

A simplified example of calculating fuel flows within a machine will now be described. For purposes of the example, it may be assumed that two different types of fuel are provided to a gas turbine having a plurality of fuel circuits, such as a plurality of combustion chambers. For example, a gas turbine may include three fuel circuits, such as fuel circuits 110a, 110b, and 110c shown in FIG. 1, that are provided with fuel from two different fuel sources, such as fuel sources 105a and 105b shown in FIG. 1. The first fuel source 105a may be a source of a first fuel type, such as natural gas, and the second fuel source 105b may be a source of a second fuel type, such as synthesis gas or syngas. The first fuel circuit 110a may be provided with natural gas; the second fuel circuit 110b may be provided with both natural gas and syngas; and the third fuel circuit 110c may be provided with syngas. A plurality of flow control devices, such as control valves 120, 122, 124, and 126 illustrated in FIG. 1, may control the provision of the natural gas and syngas to the fuel circuits 105a, 105b, 105c.

As desired, one or more parameters may be utilized for the calculations of fuel flows within the gas turbine. Examples of parameters that may be utilized include one or more of the parameters included in Table 1 below:

TABLE 1

| Parameter | Definition |
|---|---|
| DNG | Density for natural gas |
| DSG | Density for syngas |

TABLE 1-continued

| Parameter | Definition |
| --- | --- |
| E | Total energy input from fuel for the turbine |
| S1 | Energy split for the first fuel circuit |
| S2 | Energy split for the second fuel circuit |
| S3 | Energy split for the third fuel circuit |
| LHVNG | Lower heating value for natural gas in btu/CF |
| LHVNGM | Lower heating value for natural gas in btu/lbm (btu/pound-mass) |
| LHVSG | Lower heating value for syngas in btu/CF |
| LHVSGM | Lower heating value for syngas in btu/lbm |
| SGVF | Syngas volumetric fraction |

The total energy consumption from fuel (E) within the turbine may be assumed or given in certain embodiments of the invention. For example, a total energy consumption may be assumed or determined for different operating conditions and/or loads of the gas turbine. Alternatively, in other embodiments of the invention, the total energy consumption may be calculated utilizing various parameters associated with the gas turbine and/or predicted or determined utilizing one or more suitable models.

Each of the energy splits S1, S2, and S3 may define a ratio or percentage of the total energy in the turbine from fuel input E that is respectively provided to each of the fuel circuits 110a, 110b, 110c. In the example, the total of the energy splits S1, S2, and S3 may be approximately one hundred percent (100%). Any number of fuel splits may be utilized as desired within the gas turbine. For example, fuel splits may be established for individual fuel circuits and/or groups of fuel circuits.

In certain embodiments, one of the density values or lower heating values may be utilized in the calculations of fuel flows. Lower heating values may be assumed constant, measured in real-time or near real time, or predicted or inferred from one or more suitable models. Additionally, as desired, higher heating values may be utilized as an alternative to lower heating values. The SGVF may establish or define an expected fraction or portion of total fuel flow that is expected to be syngas. One or more SGVF's may be established for components of the gas turbine that receive both natural gas or syngas. Alternatively, a single SGVF may be established for the gas turbine.

In addition to the one or more parameters that may be utilized, one or more intermediate and/or final values may be calculated during the calculations of fuel flows and/or the control of the control valves 120, 122, 124, 126. Examples of values that may be calculated or determined include one or more of the values included in Table 2 below:

TABLE 2

| Value | Definition |
| --- | --- |
| E1 | Energy in the first fuel circuit |
| E2 | Energy in the second fuel circuit |
| E3 | Energy in the third fuel circuit |
| ENG2 | Energy in the second fuel circuit from natural gas |
| ESG2 | Energy in the second fuel circuit from syngas |
| M1 | Mass flow in first fuel circuit from natural gas |
| MNG2 | Mass flow in second fuel circuit from natural gas |
| MSG2 | Mass flow in second fuel circuit from syngas |
| M3 | Mass flow in third fuel circuit from syngas |
| V1 | Volumetric flow in first fuel circuit from natural gas |
| VNG2 | Volumetric flow in second fuel circuit from natural gas |
| VSG2 | Volumetric flow in second fuel circuit from syngas |
| V3 | Volumetric flow in third fuel circuit from syngas |

Utilizing the total energy consumption E or total energy flow of the fuel, desired energy flow calculations may be made for each of the fuel circuits. A respective energy consumption ratio or split S1, S2, S3 for each of the fuel circuits 110a, 110b, 110c may be established as set forth in Equations 1-3 below:

$$S1 = \frac{E1}{E} \quad (1)$$

$$S2 = \frac{E2}{E} \quad (2)$$

$$S3 = \frac{E3}{E} \quad (3)$$

The total of the values for S1, S2 and S3 may be approximately one hundred percent. Rearranging Equations 1-3, the desired energy flow or energy consumption for each of the fuel circuits may be expressed as set forth in Equations 4-6 below:

$$E1 = S1 \cdot E \quad (4)$$

$$E2 = S2 \cdot E \quad (4)$$

$$E3 = S3 \cdot E \quad (4)$$

The total of E1, E2, and E3 may be equal to the total energy E that is supplied to the gas turbine in the form of fuel. The energy consumption within each fuel circuit may then be calculated for each of the fuel types (e.g., natural gas, syngas) that is provided to each of the fuel circuits. The syngas volumetric fraction (SGVF) may be defined as the ratio of the total volume of syngas to the total volume of fuel provided to the gas turbine, as set forth in Equation 7 below:

$$SGVF = \frac{VSG2 + V3}{VSG2 + V3 + V1 + VNG2} \quad (7)$$

The volumetric and energy flows of the various fuel types within each fuel circuit may then be correlated utilizing the lower heating values of natural gas and syngas, as set forth in Equations 8-11 below:

$$V1 = \frac{E1}{LHVNG} \quad (8)$$

$$VNG2 = \frac{ENG2}{LHVNG} \quad (9)$$

$$VSG2 = \frac{ESG2}{LHVSG} \quad (10)$$

$$V3 = \frac{E3}{LHVSG} \quad (11)$$

The sum of the energy from syngas in the second fuel circuit (ESG2) and the energy from natural gas in the second fuel circuit (ENG2) may be equal to the total energy (E2) in the second fuel circuit. Equations 8-11 may be substituted into Equation 7, and the SGVF may be expressed in terms of energy flows, as set forth in Equation 12 below:

$$SGVF = \frac{\frac{E3 + ESG2}{LHVSG}}{\frac{E3 + ESG2}{LHVSG} + \frac{E1 + ENG2}{LHVNG}} \quad (12)$$

Equation 12 may then be solved for any appropriate energy value as desired, such as the value of the ENG2 that is set forth in Equation 13 below:

$$ENG2 = \frac{LHVNG(E2 + E3)(1 - SGVF) - LHVSG \cdot E1 \cdot SGVF}{LHVNG(1 - SGVF) + LHVSG \cdot SGVF} \quad (13)$$

Once the energy flow or energy consumption for natural gas in the second fuel circuit is obtained, the energy flow for syngas in the second fuel circuit may be obtained utilizing Equation 14 below:

$$ESG2 = E2 - ENG2 \quad (14)$$

The values for E1 and E3 may also be obtained utilizing equations 4 and 6. Once the energy flow values are obtained, the volumetric flows for syngas and natural gas in each fuel circuit may be obtained utilizing Equations 8-11 above. In other words, a respective volumetric flow for each of the one or more fuel types within each of the plurality of fuel circuits may be calculated. As desired, the mass flows for syngas and natural gas in each fuel circuit may then be obtained utilizing either density values or lower heating values for the natural gas and syngas. For example, mass flows may be determined from density utilizing Equations 15-18 below:

$$M1 = V1 \cdot DNG \quad (15)$$

$$MNG2 = VNG2 \cdot DNG \quad (16)$$

$$MSG2 = VSG2 \cdot DSG \quad (17)$$

$$M3 = V3 \cdot DSG \quad (18)$$

As another example, mass flows may be determined from lower heating values utilizing Equations 19-22 below:

$$M1 = \frac{E1}{LHVNGM} \quad (19)$$

$$MNG2 = \frac{ENG2}{LHVNGM} \quad (20)$$

$$MSG2 = \frac{ESG2}{LHVSGM} \quad (21)$$

$$M3 = \frac{E3}{LHVSGM} \quad (22)$$

Once the mass flows are obtained for each of the fuel types that are provided to each of the fuel circuits, a valve position or valve stroke for each of the control valves 120, 122, 124, 126 that control the provision of fuel to the fuel circuits 110a, 110b, 110c may be determined. The determination of a valve positions may be similar to conventional valve position determinations that are made with respect to mass flow based fuel splits and will be readily understood by those skilled in the art. However, the determinations of valve positions that are made in accordance with embodiments of the invention take the characteristics of the different fuel types (e.g., natural gas and syngas) into account. In this regard, the variation in mass flows required by different types of fuel to provide the same amount of energy to a fuel circuit may be taken into account.

The invention is described above with reference to block and flow diagrams of systems, methods, apparatuses, and/or computer program products according to example embodiments of the invention. It will be understood that, in certain embodiments, one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. In other embodiments, certain blocks in the block diagrams may be performed manually by one or more individuals.

In computer-implemented embodiments, the computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method for controlling fuel flow within a machine, the method comprising:
   identifying a plurality of fuel types provided simultaneously to the machine;
   identifying a plurality of fuel circuits associated with the machine, a first group of the plurality of fuel circuits adapted to be provided with one or more of the plurality of fuel types, a second group of the plurality of fuel circuits adapted to be provided with at least two of the plurality of fuel types;
   identifying a fuel flow parameter for calculating fuel flow comprising at least one of: an energy flow parameter, a volumetric flow parameter, or a fuel constituent flow parameter;
   calculating a respective energy flow for each of the one or more fuel types provided to each of the plurality of fuel circuits based at least in part on the identified fuel flow parameter, wherein calculating the respective energy flow is initiated by determining a ratio of total energy flow of the machine to the respective energy flow provided to each of the plurality of fuel circuits; and
   controlling, based at least in part on the calculation of the respective energy flows, operation of one or more fuel flow control devices providing fuel to the plurality of fuel circuits.

2. The method of claim 1, wherein identifying a plurality of fuel circuits associated with the machine comprises identifying a plurality of fuel circuits associated with a gas turbine.

3. The method of claim 1, wherein identifying a plurality of fuel types comprises identifying a natural gas fuel type and a synthesis gas fuel type.

4. The method of claim 1, wherein identifying a fuel flow parameter comprises identifying an energy flow parameter, the energy flow parameter comprising at least one of: a lower heating value parameter, a higher heating value parameter, a gross heating value parameter, an energy density parameter, a Wobbe Index parameter, or a modified Wobbe Index parameter.

5. The method of claim 1, further comprising:
   calculating a respective fuel flow for each of the plurality of fuel circuits based at least in part on the identified fuel flow parameter,
   wherein calculating a respective fuel flow for each of the one or more fuel types provided to each of the plurality of fuel circuits comprises calculating a respective fuel flow for each of the one or more fuel types based at least in part on the calculated fuel flows for each of the plurality of fuel circuits.

6. The method of claim 1, wherein controlling operation of one or more fuel flow control devices comprises adjusting respective positions of one or more fuel flow control valves.

7. The method of claim 1, further comprising:
   calculating, based at least in part on the respective energy fuel flows, a respective volumetric flow for each of the one or more fuel types within each of the plurality of fuel circuits.

8. The method of claim 7, further comprising:
   calculating, based at least in part on the respective volumetric flows, a respective mass flow for each of the one or more fuel types within each of the plurality of fuel circuits,
   wherein controlling operation of one or more fuel flow control devices comprises controlling operation of one or more fuel flow control devices based at least in part on the calculated respective mass flows.

9. The method of claim 8, wherein calculating a respective mass flow for each of the one or more fuel types within each of the plurality of fuel circuits comprises calculating a respective mass flow for each of the one or more fuel types within each of the plurality of fuel circuits utilizing one of respective fuel densities or respective lower heating values.

10. A system for controlling fuel flow within a machine, the system comprising:
    at least one memory operable to store computer-executable instructions; and
    at least one processor configured to access the at least one memory and execute the computer-executable instructions to:
       identifying a plurality of fuel types provided simultaneously;
       identify a plurality of fuel circuits associated with the machine, a first group of the plurality of fuel circuits adapted to be provided with one or more of the plurality of fuel types, a second group of the plurality of fuel circuits adapted to be provided with at least two of the plurality of fuel types;
       identify a fuel flow parameter for calculating fuel flow comprising at least one of:
    an energy flow parameter, a volumetric flow parameter, or a fuel constituent flow parameter;
       calculate a respective energy flow for each of the one or more fuel types provided to each of the plurality of fuel circuits based at least in part on the identified fuel flow parameter, wherein calculating the respective energy flow is initiated by determining a ratio of total energy flow of the machine to the respective energy flow provided to each of the plurality of fuel circuits; and
       control, based at least in part on the calculation of the respective energy flows, operation of one or more fuel flow control devices providing fuel to the plurality of fuel circuits.

11. The system of claim 10, wherein the machine comprises a gas turbine.

12. The system of claim 10, wherein the plurality of fuel types comprise a natural gas fuel type and a synthesis gas fuel type.

13. The system of claim 10, wherein the fuel flow parameter comprises an energy flow parameter, the energy flow parameter comprising at least one of: a lower heating value parameter, a higher heating value parameter, a gross heating value parameter, an energy density parameter, a Wobbe Index parameter, or a modified Wobbe Index parameter.

14. The system of claim 10, wherein the at least one processor is further configured to execute the computer-executable instructions to:
    calculate a respective fuel flow for each of the plurality of fuel circuits based at least in part on the identified fuel flow parameter; and
    calculate the respective fuel flow for each of the one or more fuel types provided to each of plurality of fuel circuits based at least in part on the calculated fuel flows for each of the plurality of fuel circuits.

15. The system of claim 10, wherein the one or more fuel flow control devices comprise one or more fuel flow control valves, and wherein the at least one processor is operable to adjust respective positions of the one or more fuel flow control valves.

16. The system of claim 10, wherein the at least one processor is further configured to execute the computer-executable instructions to:
   calculate, based at least in part on the respective fuel flows, a respective volumetric flow for each of the one or more fuel types within each of the plurality of fuel circuits.

17. The system of claim 16, wherein the at least one processor is further configured to execute the computer-executable instructions to:
   calculate, based at least in part on the respective volumetric flows, a respective mass flow for each of the one or more fuel types within each of the plurality of fuel circuits; and
   control operation of the one or more fuel flow control devices based at least in part on the calculated respective mass flows.

18. The system of claim 17, wherein the at least one processor is operable to calculate the respective mass flow for each of the one or more fuel types within each of the plurality of fuel circuits utilizing one of respective fuel densities or respective lower heating values.

* * * * *